(12) United States Patent
Akita et al.

(10) Patent No.: US 9,546,616 B2
(45) Date of Patent: Jan. 17, 2017

(54) FUEL SUPPLY SYSTEM

(71) Applicant: AISAN KOGYO KABUSHIKI KAISHA, Obu-shi, Aichi-ken (JP)

(72) Inventors: Minoru Akita, Ama (JP); Naoyuki Tagawa, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 226 days.

(21) Appl. No.: 14/564,856

(22) Filed: Dec. 9, 2014

(65) Prior Publication Data

US 2015/0159577 A1    Jun. 11, 2015

(30) Foreign Application Priority Data

Dec. 9, 2013  (JP) ................................ 2013-253787

(51) Int. Cl.
| | |
|---|---|
| F02D 41/30 | (2006.01) |
| F02M 37/08 | (2006.01) |
| F02D 41/38 | (2006.01) |
| F02D 33/00 | (2006.01) |
| F02D 41/12 | (2006.01) |

(52) U.S. Cl.
CPC ......... F02D 41/3082 (2013.01); F02D 33/003 (2013.01); F02D 41/3854 (2013.01); F02M 37/08 (2013.01); *F02D 41/12* (2013.01); *F02D 2200/0602* (2013.01); *Y02T 10/42* (2013.01)

(58) Field of Classification Search
CPC ...... F02D 41/00; F02D 41/30; F02D 41/3082; F02D 41/12; F02D 41/14; F02M 37/08; Y02T 10/42
See application file for complete search history.

(56) References Cited

U.S. PATENT DOCUMENTS

| | | | |
|---|---|---|---|
| 6,125,832 A * | 10/2000 | Toyohara | F02D 11/105 123/479 |
| 6,450,148 B2 | 9/2002 | Nakamura et al. | |
| 9,382,866 B2 * | 7/2016 | Akita | F02D 41/3082 |
| 2014/0174403 A1 | 6/2014 | Akita et al. | |
| 2015/0330346 A1 * | 11/2015 | Tagawa | F02M 37/08 123/496 |

FOREIGN PATENT DOCUMENTS

| | | |
|---|---|---|
| JP | 06-74120 A | 3/1994 |
| JP | 2001-152992 A | 6/2001 |
| JP | 2007-285272 A | 11/2007 |
| JP | 2007-285273 A | 11/2007 |

* cited by examiner

*Primary Examiner* — Hieu T Vo
(74) *Attorney, Agent, or Firm* — Conley Rose, P.C.

(57) ABSTRACT

A fuel supply system for an internal combustion engine has a fuel pump capable of pumping fuel from a fuel tank to the internal combustion engine, a motor driving the fuel pump, a pressure sensor configured to detect pressure of the fuel pumped from the fuel pump, and a control unit configured to output control signals to the motor. The control unit is configured to perform feedback control of duty ratio of the control signals for the motor, and to control the duty lower limit guard value in order to limit an amount of decreases of the duty lower limit guard value in the step-like manner when a duty lower limit guard value decreases.

6 Claims, 7 Drawing Sheets

| AMOUNT OF CHANGE IN ACCELERATOR OPENING RATIO [%] | 1.0 | 2.0 | 4.0 | 8.0 |
|---|---|---|---|---|
| FIRST LOWER LIMIT GUARD VALUE [%] | 45 | 50 | 55 | 60 |

FIG. 4

| TARGET FUEL PRESSURE [kPa] | 300 | 400 | 500 | 600 |
|---|---|---|---|---|
| REFERENCE FUEL PRESSURE [kPa] | 350 | 450 | 550 | 650 |

| AMOUNT OF CHANGE IN THROTTLE OPENING RATIO [%] | 1.0 | 2.0 | 4.0 | 8.0 |
|---|---|---|---|---|
| INTEGRATION VALUE [%] | 0.1 | 1.52 | 2.66 | 10.0 |

| AMOUNT OF CHANGE IN THROTTLE OPENING RATIO [%] | −1.0 | −2.0 | −4.0 | −8.0 |
|---|---|---|---|---|
| SUBTRACTION VALUE [%] | 0.1 | 0.1 | 0.1 | 0.1 |

| TARGET FUEL PRESSURE [kPa] | 300 | 400 | 500 | 600 |
|---|---|---|---|---|
| REFERENCE FUEL PRESSURE [kPa] | 450 | 550 | 650 | 750 |

FUEL SUPPLY SYSTEM

CROSS-REFERENCE TO RELATED APPLICATIONS

This application claims priority to Japanese patent application serial number 2013-253787 filed on Dec. 9, 2013, the contents of which are incorporated herein by reference.

STATEMENT REGARDING FEDERALLY SPONSORED RESEARCH OR DEVELOPMENT

Not Applicable.

BACKGROUND

This disclosure relates to a fuel supply system for an internal combustion engine (engine). The fuel supply system has a fuel pump for pumping fuel from a fuel tank to the engine, a motor for operating the fuel pump, and a control unit for performing feedback control of the duty ratio (also referred to as "duty cycle") of electric pressure (also referred to as "voltage") applied to the motor such that a fuel pressure comes close to a target fuel pressure.

For example, in a recent vehicle, fuel is pumped from a fuel pump into a fuel pipe and then is injected from injectors into an engine in order to supply the fuel to the engine. Further, feedback control of pressure of the fuel discharged from the fuel pump is performed such that fuel pressure in the fuel pipe increases or decreases depending on, e.g., an operating condition of the engine in order to further improve fuel efficiency, etc. However, in the state that the feedback control of the fuel pressure is performed, overshoot and undershoot of the fuel pressure are likely to occur, so that it is necessary to prevent such overshoot and undershoot.

In the fuel supply system for the engine according to Japanese Laid-Open Patent Publication No. 2007-285272, during a fuel cut condition, the overshoot of the fuel pressure in the fuel pipe is prevented by performing feedback control of a fuel pump, in which it is integrated with using an integration correction factor smaller than one is used in a condition without fuel cut. Further, during a return process from the fuel cut condition, the undershoot of the fuel pressure in the fuel pipe is prevented by temporarily increasing electric pressure applied to the fuel pump depending on the fuel pressure in the fuel pipe during the return process. In the invention disclosed in Japanese Laid-Open Patent Publication No. 2007-285272, prevention of the overshoot is effectively performed only in the condition that the operating condition of the engine is fuel cut, and prevention of the undershoot is effectively performed only in the condition that the operating condition of the engine is in the return process from the fuel cut condition. Accordingly, there has been a need for improved fuel supply systems.

BRIEF SUMMARY

In one aspect of this disclosure, a fuel supply system for an internal combustion engine has a fuel pump capable of pumping fuel from a fuel tank to the internal combustion engine, a motor driving the fuel pump, a pressure sensor configured to detect pressure of the fuel pumped from the fuel pump, and a control unit configured to output control signals to the motor. The control unit is configured to perform feedback control of duty ratio of the control signals for the motor such that the pressure of the pumped fuel comes close to a predetermined target fuel pressure, to receive information relating to pressure of the fuel discharged from the fuel pump and information relating to an operating condition of the internal combustion engine, to calculate the duty ratio of the control signals such that discharge fuel pressure based on the information relating to the pressure of the fuel discharged from the fuel pump comes close to the predetermined target fuel pressure, to output control signals corresponding to the calculated duty ratio to the motor, to calculate duty lower limit guard value depending on the operating condition of the internal combustion engine based on the information relating to the operating condition of the internal combustion engine, to guard the lower limit value of the duty ratio with the duty lower limit guard value when outputting the control signals corresponding to the calculated duty ratio, and to control the duty lower limit guard value in order to limit an amount of decreases of the duty lower limit guard value in the step-like manner when the duty lower limit guard value decreases.

According to the aspect of this disclosure, when the duty lower limit guard value decreases in the step-like manner, the duty lower limit guard value is increased in order to decrease the amount of the decrease of the duty lower limit guard value in the step-like manner. Thus, such drastic decrease (i.e., decrease in the step-like manner) can be prevented in various operating condition of the internal combustion engine regardless the fuel cut condition and the returning operation from the fuel cut condition. Accordingly, the undershoot of the duty ratio can be prevented, and the undershoot of the discharge fuel pressure can appropriately prevented.

DETAILED DESCRIPTION

Each of the additional features and teachings disclosed above and below may be utilized separately or in conjunction with other features and teachings to provide improved fuel supply systems. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of this disclosure. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
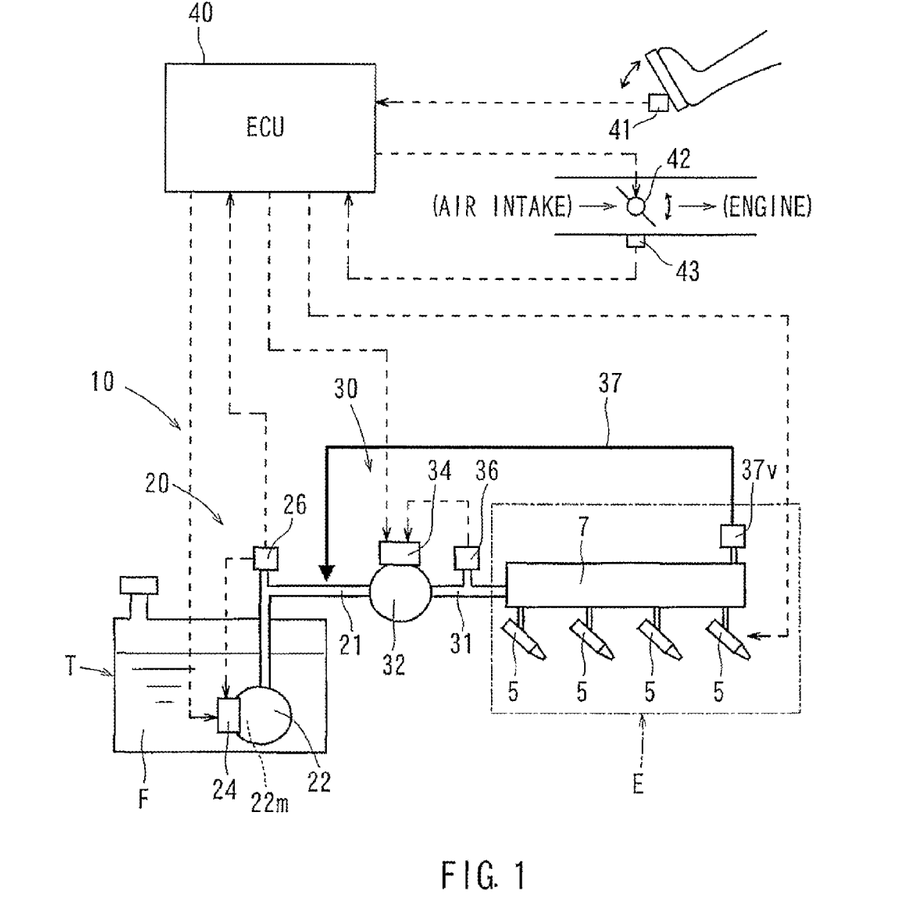
FIG. 1 is a diagram illustrating a fuel supply system for an engine.

A fuel supply system 10 is configured to supply fuel F from a fuel tank T of a vehicle to an engine E (internal combustion engine). As shown in FIG. 1, the fuel supply system 10 has a low pressure fuel pump unit 20 and a high pressure fuel pump unit 30, which are connected to each other in series. The low pressure fuel pump unit 20 is configured to supply the fuel to the high pressure fuel pump unit 30 at a predetermined pressure, and is connected with the high pressure fuel pump unit 30 via a low pressure fuel pipe 21. The low pressure fuel pump unit 20 has a fuel pump 22 disposed in the fuel tank T, a motor 22m operating the fuel pump 22, a low pressure control unit 24 controlling the motor 22m based on signals from an engine control unit (ECU) 40, and a pressure sensor 26 mounted on the low pressure fuel pipe 21 and configured to detect pressure P of the fuel F discharged from the fuel pump 22. The low pressure control unit 24 performs feedback control of duty ratio of electric pressure applied to the motor 22m such that the pressure P of the fuel F discharged from the fuel pump 22 (hereinafter, referred to as fuel pressure P) comes close to a target fuel pressure Ps set by the ECU 40. Further, the low pressure control unit 24 is configured to increase and decrease a lower limit guard value that is a lower limit value of the duty ratio based on an accelerator sensor signal and a throttle sensor signal output from the ECU 40 as described below. The ECU 40 receives a detection signal from an accelerator (opening ratio) sensor 41 configured to detect opening ratio of an accelerator operated by a driver, outputs a control signal to a throttle valve driving motor 42 configured to control the amount of air intake of the engine, and receives a detection signal from a throttle (opening ratio) sensor 43.

The high pressure fuel pump unit 30 is configured to increase the pressure P of the fuel F, which has been supplied from the low pressure fuel pump unit 20, and to pump it to the engine E. The high pressure fuel pump unit 30 is connected to a delivery pipe 7 of the engine E via a high pressure fuel pipe 31. The high pressure fuel pump unit 30 has a fuel pump 32, a high pressure control unit 34 configured to control the fuel pump 32 depending on signals from the ECU 40, and a pressure sensor 36 mounted on the high pressure fuel pipe 31 and configured to detect pressure of the fuel discharged from the fuel pump 32. The high pressure fuel pump unit 30 supplies highly-pressurized fuel to the delivery pipe 7 of the engine E, and the highly-pressurized fuel is injected from a plurality of injectors 5 provided on the delivery pipe 7 into an combustion chamber (not shown) of the engine E. Excess fuel in the delivery pipe 7 is returned to the low pressure fuel pipe 21 through a valve 37v and a return pipe 37.

Figures 2A, 2B:
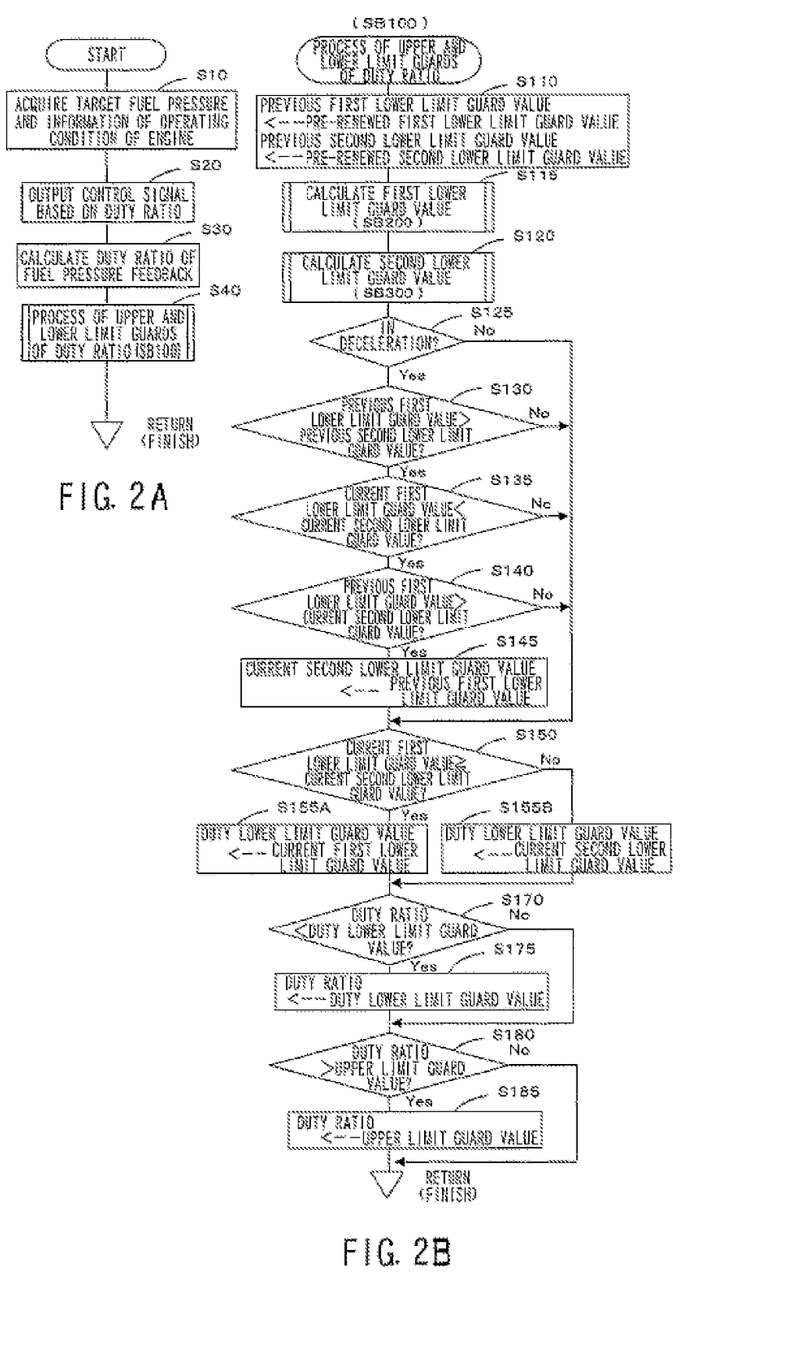
FIGS. 2A and 2B provide flowcharts illustrating an operating procedure of the fuel supply system according to a first embodiment.

Processes and operations of the low pressure control unit 24 of the low pressure fuel pump unit 20 according to a first embodiment will be described with reference to FIGS. 2-11. In the first embodiment, prevention of undershoot in the feedback control of the pressure of the fuel discharged from the fuel pump can be possible during various operating conditions of the internal combustion engine regardless the fuel cut condition and returning operation from the fuel cut condition. The process shown in the flowchart of FIG. 2A is repeatedly performed, e.g., every 5 milliseconds (ms), based on a program stored in a memory device of a microcomputer of the low pressure control unit 24. That is, the low pressure control unit 24 corresponds to a control unit of this disclosure. The various steps of the flowcharts of FIGS. 2, 3 and 6 will be described below.

Referring to FIG. 2A, the low pressure control unit 24 acquires a target fuel pressure Ps at step S10, and progresses to step S20. In this case, as shown in FIG. 1, the low pressure control unit 24 acquires the target fuel pressure Ps from the ECU 40 by communication, etc. Alternatively, the target pressure Ps can be acquired from a device other than the ECU 40 or can be calculated in the low pressure control unit 24. The low pressure control unit 24 acquires information relating to the operating condition of the engine (internal combustion engine) (e.g., accelerator opening ratio and/or throttle valve opening ratio) in addition to the target fuel pressure Ps. The low pressure control unit 24 outputs a control signal (PWM signal) based on the duty ratio (in this case, the duty ratio calculated in the last process) to the motor 22m in order to drive the motor 22m at step S20, and progresses to step S30. The low pressure control unit 24 compares the acquired target fuel pressure Ps (e.g., 500 kPa) with the actual fuel pressure P (corresponding to discharge fuel pressure) detected by the pressure sensor 26 and calculates the duty ratio of electric pressure applied to the motor 22m based on a resulting deviation at step S30, and progresses to step S40. At step S40, the low pressure control unit 24 guards an upper limit and a lower limit of the duty ratio calculated in step S30 by performing a sub-routine SB100, and then finishes the process. Here, the sub-routine SB100 will be described below. FIG. 2B provides an example of an implementation of step S40 (subroutine SB100).

Referring to FIG. 2B, at step S110 the low pressure control unit 24 assigns (copies) a pre-renewed first lower limit guard value (a first lower limit guard value in the last process) in a previous first lower limit guard value and assigns (copies) a pre-renewed second lower limit guard value (a second lower limit guard value in the last process) in a previous second lower limit guard value at step S110, and progresses to step S115. The low pressure control unit 24 performs the sub-routine SB200 for calculating the first lower limit guard value (refer to FIG. 3) in order to calculate a current first lower limit guard value at step S115, and then progresses to step S120. The sub-routine SB200 will be described later. The low pressure control unit 24 performs the sub-routine SB300 for calculating the second lower limit guard value (refer to FIG. 6) in order to calculate a current second lower limit guard value at step S120, and then progresses to step S125. The sub-routine SB300 will be described later. And, in following steps, the larger one of the first lower limit value and the second lower limit guard value is set as the duty lower limit guard value and is used to guard the lower limit value of the duty ratio.

At step S125, the low pressure control unit 24 determines whether the engine is in the deceleration state or not based on the information relating to the operating condition of the engine, which has been acquired at step S10 (FIG. 2A). The lower pressure control unit 24 determines whether the engine is in the deceleration state or not based on, for example, the opening ratio of the accelerator (e.g., the opening ratio of the accelerator is less than 5%) or the change in the number of revolutions of the engine (e.g., the number of revolutions is decreasing). Then, the low pressure control unit 24 progresses to step S130 when the engine is in the deceleration state (Yes), or progresses to step S150 when the engine is not in the deceleration state (No).

When progressing to step S130, the low pressure control unit 24 determines whether the previous first lower limit guard value (refer to step S110) is larger than the previous second lower limit guard value (refer to step S110) or not (that is, it is determined whether the duty lower limit guard value was the first lower limit guard value in the last process). The low pressure control unit 24 progresses to step S135 when the previous first lower limit guard value is larger than the previous second lower limit guard value (Yes), or progresses to step 150 when the previous first lower limit guard value is not larger than the previous second lower limit guard value (No). When progressing to step S135, the low pressure control unit 24 determines whether the current first lower limit guard value (refer to step S115) is smaller than the current second lower limit guard value (refer to step S120) or not (that is, it is determined whether the duty lower limit guard value is the second lower limit guard value in the current process or not (whether it has been changed from the first lower limit guard value to the second lower limit guard value or not)). The low pressure control unit 24 progresses to step S140 when the current first lower limit guard value is smaller than the current second lower limit guard value (Yes), or progresses to step S150 when the current first lower limit guard value is not smaller than the current second lower limit guard value (No).

When progressing to step S140, the low pressure control unit 24 determines whether the previous first lower limit guard value is larger than the current second lower limit guard value or not. The lower pressure control unit 24 progresses to step S145 when the previous first lower limit guard value is larger than the current second lower limit guard value (Yes), or progresses to step S150 when the previous first lower limit guard value is not larger than the current second lower limit guard value (No). When progressing to step S145, the low pressure control unit 24 assigns the previous first lower limit guard value in the current second lower limit guard value and then progresses to step S150. In this way, in election of the larger one of the first lower limit guard value and the second lower limit guard value, when it is changed from the first lower limit guard value to the second lower limit guard value and when the first lower limit guard value immediately before the change (the previous first lower limit guard value) is larger than the second lower limit guard value immediately after the change (the current second lower limit guard value), the low pressure control unit 24 uses the second lower limit guard value immediately after the change and the first lower limit guard immediately before the change.

At step S150, the low pressure control unit 24 determines whether the current first lower limit guard value is equal to or larger than the current second lower limit guard value or not. The lower pressure control unit 24 progresses to step S155A when the current first lower limit guard value is equal to or larger than the current second lower limit guard value (Yes), or progresses to step S155B when the current first lower limit guard value is not equal to nor larger than the current second lower limit guard value (No). When progressing to step S155A, the low pressure control unit 24 assigns the current first lower limit guard value in the duty lower limit guard value and then progresses to step S170. When progressing to step S155B, the low pressure control unit 24 assigns the current second lower limit guard value in the duty lower limit guard value and then progresses to step S 170. In this way, the low pressure control unit 24 assigns the larger one of the first lower limit guard value and the second lower limit guard value in the duty lower limit guard value.

At step 170, the low pressure control unit 24 determines whether the duty ratio calculated at step S30 is smaller than the duty lower limit guard value or not. The low pressure control unit 24 progresses to step S175 when the duty ratio is smaller than the duty lower limit guard value (Yes), or progresses to step S180 when the duty ratio is not smaller than the duty lower limit guard value (No). When progressing to step S175, the low pressure control unit 24 assigns the duty lower limit guard value in the duty ratio and then progresses to step S180. At step S180, the low pressure control unit 24 determines whether the duty ratio is larger than a predetermined upper limit guard value (e.g., 99% (fixed)) or not. The low pressure control unit 24 progresses to step S185 when the duty ratio is larger than the upper limit guard value (Yes), or finishes the process when the duty ratio is not larger than the upper limit guard value (No). When progressing to step S185, the low pressure control unit 24 assigns the upper limit guard value in the duty ratio and finishes the process.

Figure 4:
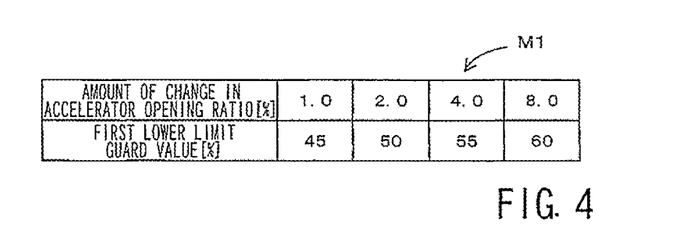
FIG. 4 is a map illustrating relationship between the change in the accelerator opening ratio and the lower limit guard value.
Figure 5:
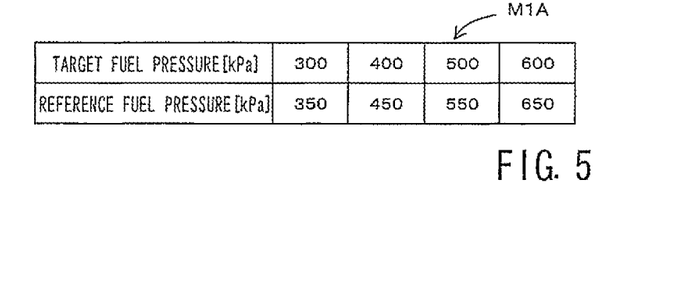
FIG. 5 is a map illustrating relationship between the target fuel pressure and the reference fuel pressure.

Next, the sub-routine SB200 (refer to step S115 in FIG. 2B) will be described with reference to FIGS. 3-5. The sub-routine SB200 is a process for calculating the first lower limit guard value depending on the accelerator opening ratio. At step S201, the low pressure control unit 24 determines whether an inflation step of the first lower limit guard value depending on the accelerator opening ratio has been performed or not. The low pressure control unit 24 finishes the process (returns) when the inflation step has been performed (Yes), or progresses to step S202 when the inflation step has not been performed (No). Here, the inflation step will not be described in detail. When progressing to step S202, the low pressure control unit 24 determines whether the it is in a speed increasing state by the accelerator (e.g., whether the opening ratio of the accelerator is higher than a predetermined opening ratio) or not. The low pressure control unit 24 progresses to step S203 when it is in the speed increasing state by the accelerator (Yes), or progresses to step S206 when it is not in the speed increasing state by the accelerator (No). When progressing to step S203, the low pressure control unit 24 determines whether the actual fuel pressure P (corresponding to the discharge fuel pressure) is equal to or higher than a reference fuel pressure (kPa) and whether the duty ratio is lower than, for example, 45%. The low pressure control unit 24 progresses to step S204 when the fuel pressure P is equal to or higher than the reference fuel pressure (kPa) and when the duty ratio is lower than 45% (Yes), or progresses to step S205 when not meeting such requirements. The reference fuel pressure can be a fixed value such as 550 kPa, can be set at the total value of the target fuel pressure and 50 kPa, and can be calculated, for example, based on a map MIA of FIG. 5 and the target fuel pressure by such as complementary of the map.

When progressing to step S204, the low pressure control unit 24 assigns a first predetermined value (60% in this case) in to the first lower limit guard value and finishes the process (returns). When progressing to step S205, the low pressure control unit 24 assigns a value calculated based on a map M1 of FIG. 4 and the accelerator opening ratio such as by a complementary of the map in the first lower limit guard value, and finishes the process (returns). When progressing to step S206, the low limit pressure control unit 24 determines whether the accelerator opening ratio is less than, for example, 5% or not. The low limit pressure control unit 24 progresses to step S207 when the accelerator opening ratio is less than 5% (Yes), or finishes the process (returns) when the accelerator opening ratio is not less than 5% (No). When progressing to step S207, the low pressure control unit 24 assigns a second predetermined value (35% in this case) in the first lower limit guard value and finishes the process (returns). Here, the first lower limit guard value is not limited to the above-described example, and can be calculated depending on the accelerator opening ratio or the change in the accelerator opening ratio. The first lower limit guard value is temporarily increased depending on the accelerator opening ratio or the change in the accelerator opening ratio while meeting predetermined requirements when the accelerator is changed in its opening direction.

The sub-routine SB300 (refer to step S120 in FIG. 2) will be described with reference to FIGS. 6-9. The sub-routine SB300 is a process for calculating the second lower limit guard value based on the throttle valve opening ratio. At step S301, the low pressure control unit 24 determines whether it is in a speed increasing state by the throttle (e.g., the opening ratio of the throttle valve is equal to or higher than a predetermined opening ratio). The low pressure control unit 24 progresses to step S302 when it is in the speed increasing state by the throttle (Yes), or progresses to step S305 when it is not in the speed increasing state by the throttle (No). When progressing to step S302, the low pressure control unit 24 determines whether the actual fuel pressure P (corresponding to the discharge fuel pressure) detected by the pressure sensor 26 is equal to or higher than a reference fuel pressure (kPa) or not. The low pressure control unit 24 finishes the process (returns) when the fuel pressure P is equal to or higher than the reference fuel pressure (kPa) (Yes), or progresses to step S303 when the fuel pressure P is not equal to nor higher than the reference fuel pressure (kPa) (No). In this case, the reference fuel pressure can be a fixed value such as 650 kPa, can be set at a total value of the target fuel pressure and 150 kPa, or can be calculated based on a map M2C of FIG. 9 and the target fuel pressure by such as complementary of the map. When progressing to step S303, the low pressure control unit 24 calculates a value of integral (integration value) based on the amount of change in the throttle valve opening ratio (the amount of change in the opening direction (+) in this case) and a map M2A (opening direction) of FIG. 7 by such as complementary of the map, and progresses to step S304. The low pressure control unit 24 renews the second lower limit guard value by adding the calculated integration value to the second lower limit guard value at step S304, and finishes the process (returns).

Figure 8:
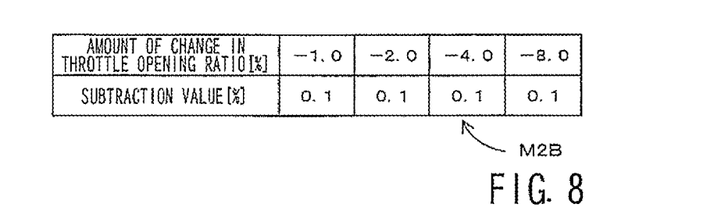
FIG. 8 is a map illustrating relationship between the amount of change in the throttle opening ration and the subtraction value.
Figure 9:
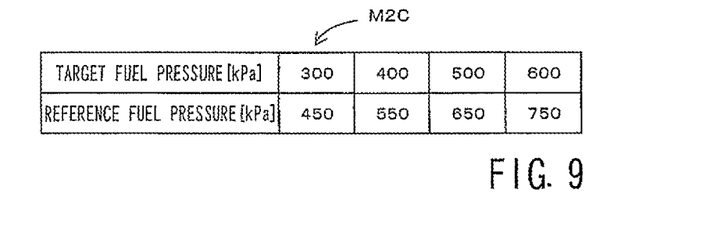
FIG. 9 is a map illustrating relationship between the target fuel pressure and the reference fuel pressure.

When progressing to step S305, the low pressure control unit 24 calculates a value of integral (subtraction value) based on the amount of change in the throttle valve opening ratio (the amount of change in the closing direction (−) in this case) and a map M2B (closing direction) of FIG. 8 by such as complementary of the map, and progresses to step S306. The low pressure control unit 24 renews the second lower limit guard value by subtracting the calculated subtraction value from the second lower limit guard value at step S306, and finishes the process (returns). The second lower limit guard value is not limited to the above-described example, and the value of integral is added or subtracted such that the second lower limit guard value gradually changes based on the opening ratio or the change in the opening ratio of the throttle valve controlling the air intake volume of the engine depending on the operating condition of the engine, which includes the opening ratio of the accelerator. The process of steps S110 and S125-S145 in the sub-routine SB100 shown in the flowchart of FIG. 2B corresponds to a process for preventing the undershoot.

Figure 6:
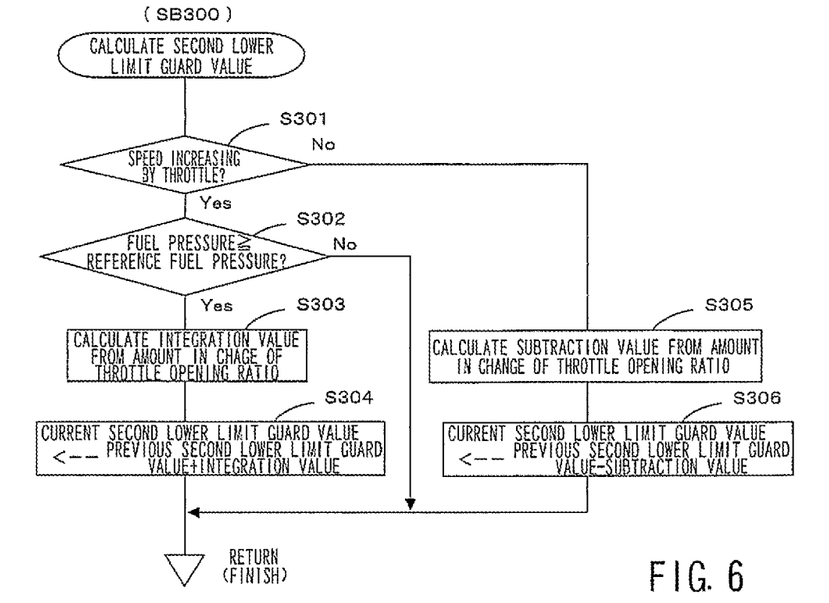
FIG. 6 is a flowchart illustrating the operating procedure of the fuel supply system according to the first embodiment.
Figure 7:
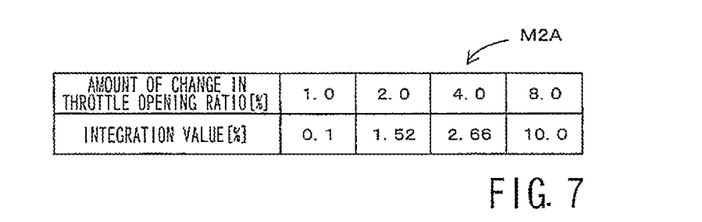
FIG. 7 is a map illustrating relationship between the amount of change in a throttle opening ratio and the integration value.
Figure 10:
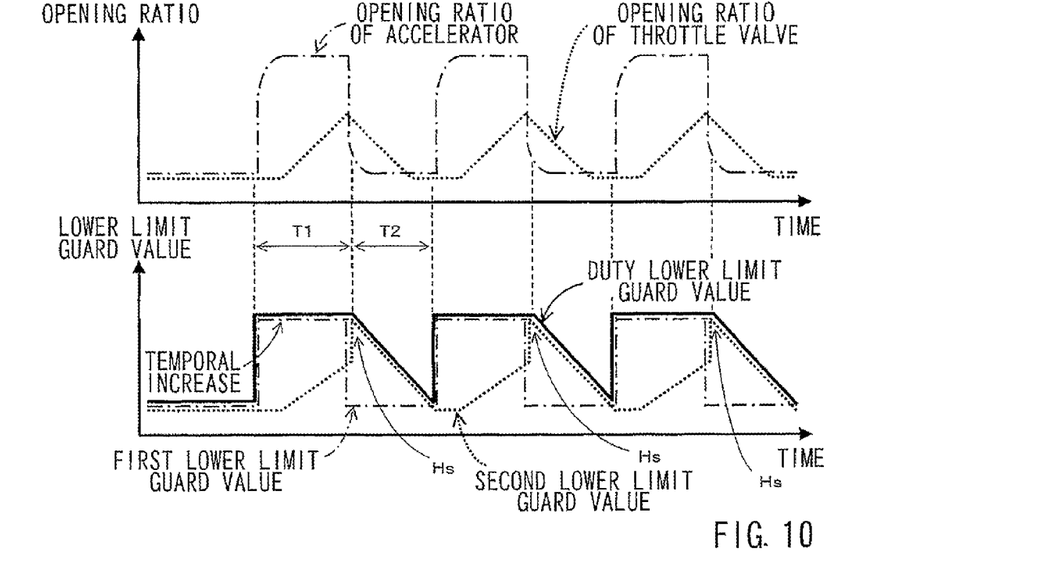
FIG. 10 is a graph illustrating an operation for preventing undershoot by the procedure according to the first embodiment.
Figure 11:
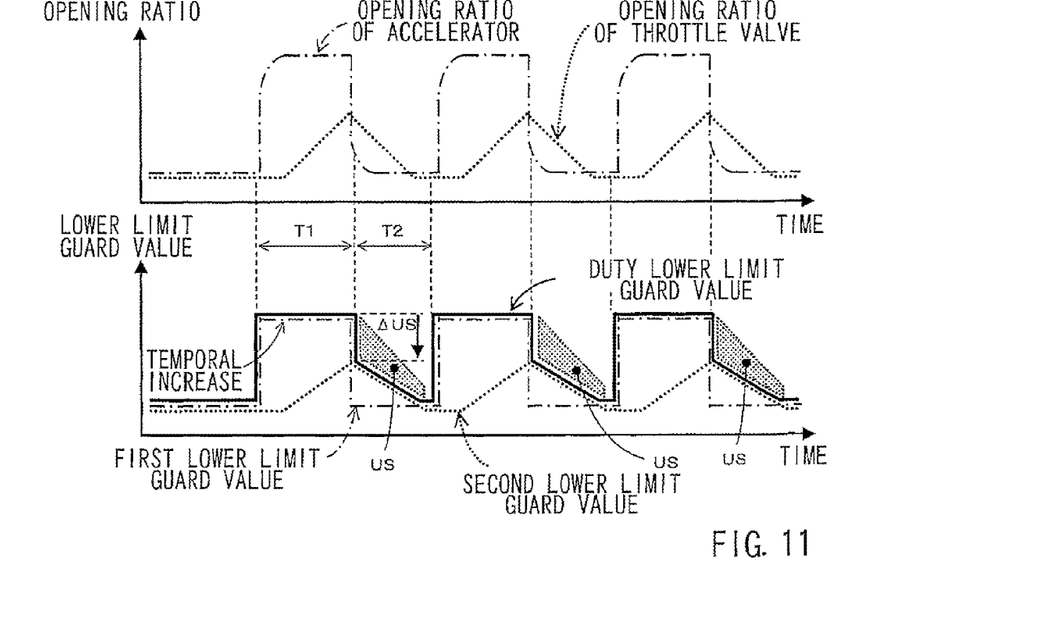
FIG. 11 is a graph illustrating a comparative example of an operation including undershoot.

Next, a summary of changes of the first lower limit value, the second lower limit guard value and the duty lower limit guard value by the processes shown by the flowcharts of FIGS. 2B, 3 and 6 will be described with reference to FIGS. 10 and 11. Here, FIG. 10 shows an operation of this disclosure, in which the undershoot is prevented, whereas FIG. 11 shows an operation of a relative example, in which the undershoot occurs. An upper portion of FIG. 10 shows a change in the opening ratio of the throttle valve (shown by the dotted line) depending on the change in the opening ratio of the accelerator (shown by the dashed line) based on time (horizontal axis) and opening ratio (vertical axis) in a state that the driver alternates the accelerator in the completely closed state and the completely opened state. Here, an upper portion of FIG. 11 shows the same state as that shown by the upper portion of FIG. 10. A lower portion of FIG. 10 shows the change in the first lower limit guard value (shown by the dashed line), the second lower limit guard value (shown by the dotted line) and the duty lower limit guard value (shown by the bold solid line) in the state shown by the upper portion of the FIG. 10.

Figure 3:
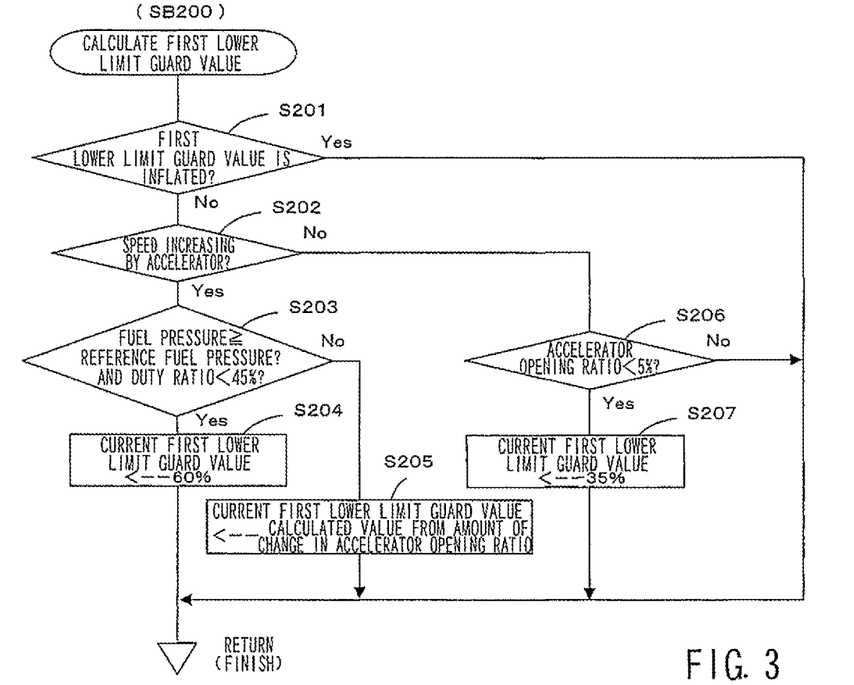
FIG. 3 is a flowchart illustrating the operating procedure of the fuel supply system according to the first embodiment.

During time period T1 in which the accelerator is in the completely opened state, the first lower limit guard value is temporarily increased by step S204 or step S205 in FIG. 3. And, during time period T1, the second lower limit guard value gradually is increased by step S304 in FIG. 6. During time period T2 in which the accelerator is changed from the completely opened state to the completely closed state and is maintained in the completely closed state, the temporal increase of the first lower limit guard value by step S204 or step S205 in FIG. 3 is stopped, and the value determined at step S207 is assigned in the first lower limit guard value. Thus, when moving into time period T2 from time period T1, the first lower limit guard value drastically decreases (in a step-like manner). Here, because the second lower limit guard value gradually decreases, step-like decrease does not occur. However, in a state that time period T1 is short, when moving into time period T2 from time period T1, the second lower limit guard value gradually changes in a decrease direction (diagonally right down direction) from a position lower than the first lower limit guard value.

In the operation of the comparative example shown by a lower portion of FIG. 11, the duty lower limit guard value (shown by the bold solid line) includes drops shown by AUS, so that there is a case that the undershoot of the fuel pressure occurs. Whereas, in the operation of this disclosure shown in the lower portion of FIG. 10, at each position shown by Hs, as shown in steps S125-S145 in FIG. 2, when the duty lower limit guard value is changed from the first lower limit guard value to the second lower limit guard value and when the first lower limit guard value immediately before the change is larger than the second lower limit guard value immediately after the change, the first lower limit guard value immediately before the change is assigned in the second lower limit guard value immediately after the change. This can eliminate the drops AUS shown in the lower portion of FIG. 11, correct the duty corresponding to missing US, and can appropriately prevent the undershoot of the fuel pressure.

As described above, when the duty lower limit guard value decreases in the step-like manner (drastically decreases), the duty lower limit guard value at the decrease in the step-like manner is increased (steps S125-S145) in order to decrease the amount of the drops of the duty lower limit guard value in the step-like manner.

Next, the process and the operation of the low pressure control unit 24 of the low pressure fuel pump unit 20 according to a second embodiment will be described with reference to FIGS. 12-14. In the process of SB100 according to the second embodiment shown in FIG. 12, step 160 and step 165 are added to SB100 of the first embodiment in order to add a step for preventing the overshoot. In the second embodiment, prevention of the overshoot and the undershoot in the feedback control of the pressure of the fuel discharged from the fuel pump can be possible during various operating conditions of the internal combustion engine regardless the fuel cut condition and returning operation from the fuel cut condition. Differences between the first embodiment and the second embodiment will be mainly described below.

Figure 12:
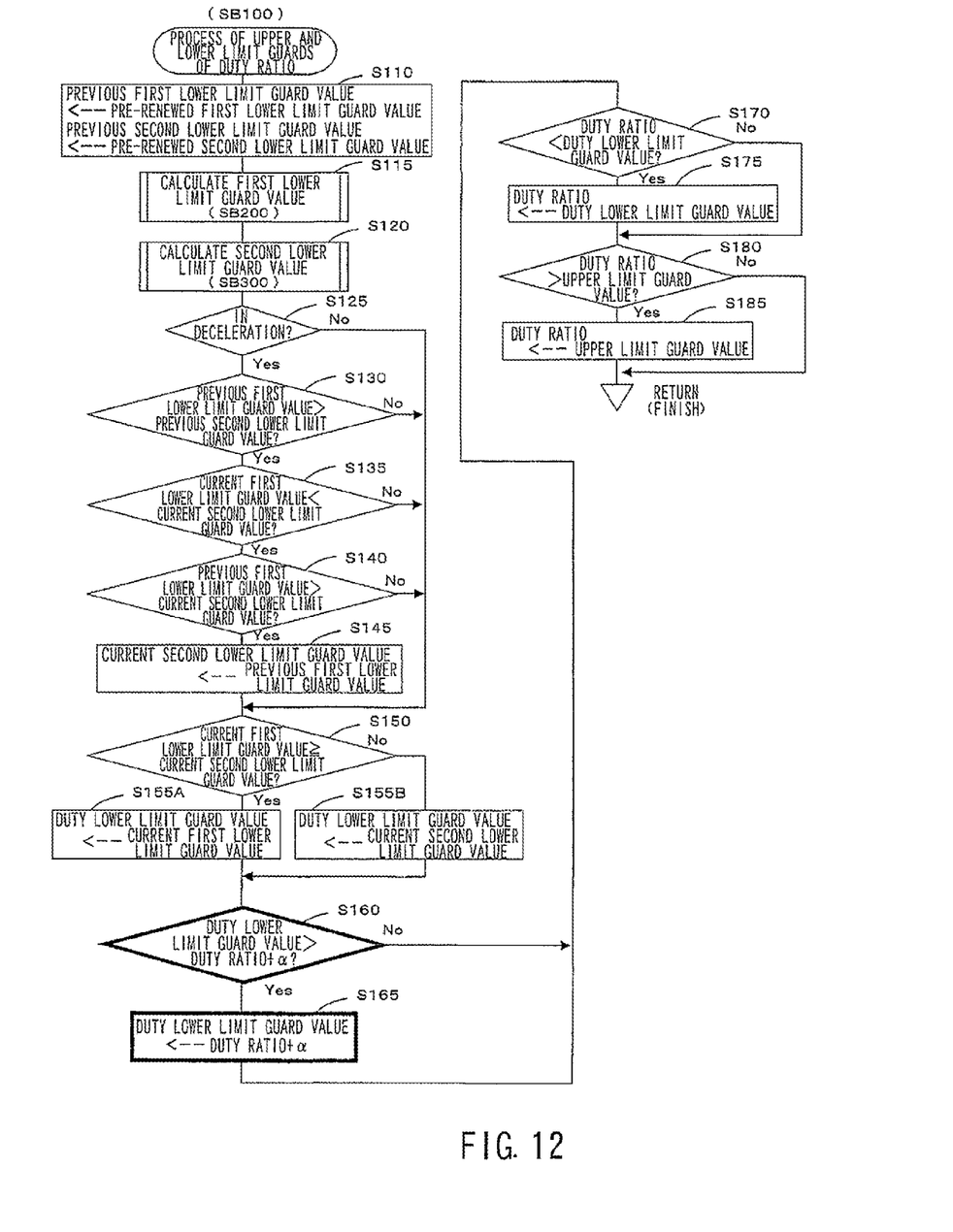
FIG. 12 is a flowchart illustrating the operating procedure of the fuel supply system according to a second embodiment.
Figure 13:
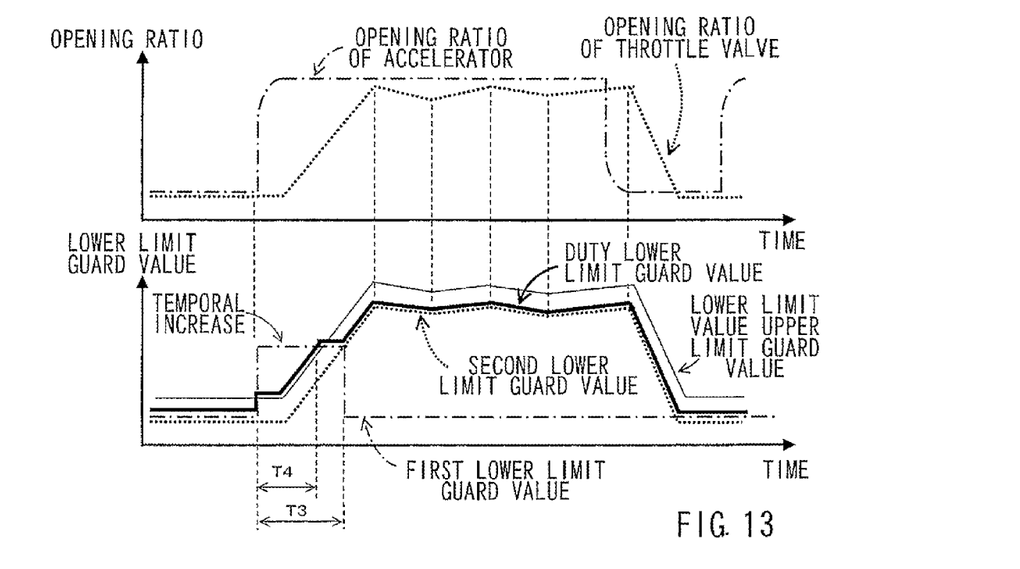
FIG. 13 is a graph illustrating an operation for preventing overshoot by the procedure according to the second embodiment.

In the flowchart of FIG. 12, steps S110 through S155A or S155B are same with those of the first embodiment, so that they will not be described again. At step S160, the low pressure control unit 24 determines whether the duty lower limit guard value is larger than, for example, the duty ratio+α (α=a predetermined value). This "the duty ratio+α" corresponds to the lower limit value upper limit guard value calculated based on the duty ratio. However, it is not limited to the duty ratio+α, and can be calculated based on the duty ratio in any manner. The low pressure control unit 24 progresses to step S165 when the duty lower limit guard value is larger than the duty ratio+α (Yes), or progresses to step S170 when the duty lower limit guard value is not larger than the duty ratio+α (No). When progressing to step S165, the low pressure control unit 24 assigns the duty ratio+α (the lower limit value upper guard value) in the duty lower limit guard value, and progresses to step S170. Here, the process of steps S170-S185 is same with that in the first embodiment shown in FIG. 2, so that it will not be described again. In the above-described flowchart of SB100 in FIG. 12, steps S160 and S165 correspond to the process for preventing the overshoot.

A summary of changes in the first lower limit guard value, the second lower limit guard value, the lower limit value upper limit guard value and the duty lower limit guard value by the process shown by the flowchart of FIG. 12 will be described with reference to FIGS. 13 and 14. Here, FIG. 13 shows an operation of this disclosure for preventing the overshoot, and FIG. 14 shows an operation of a comparative example, in which the overshoot occurs. An upper portion of FIG. 13 shows the change in the opening ratio of the throttle valve (shown by the dotted line) depending on the change in the opening ratio of the accelerator (shown by the dashed line) based on time (horizontal axis) and the opening ratio (vertical axis) in a state that the driver changes the accelerator from the completely closed state to the completely opened state and then to the completely closed state. Here, an upper portion of FIG. 14 shows the same condition with the upper portion of FIG. 13. And, a lower portion of FIG. 13 shows changes in the first lower limit guard value (shown by the dashed line), the second lower limit guard value (shown by the dotted line), the lower limit value upper limit guard value (shown by the thin solid line) and the duty lower limit guard value (shown by the bold solid line) in the condition shown by the upper portion of FIG. 13.

In time period T3 immediately after when the accelerator is changed from the completely closed state to the completely opened state, the first lower limit guard value is temporarily increased by step S204 or step S205 in FIG. 3. And, in this time period T3, the second lower limit guard value is gradually increased by step S304 in FIG. 6. At start of time period T3, the first lower limit guard value is drastically increased (in the step-like manner) by the temporal increase. After time period T3, the temporal increase of the first lower limit guard value by step S204 or step S205 in FIG. 3 is stopped, and the value calculated in step S207 is assigned in the first lower limit guard value. Thus, after time period T3, the first lower limit guard value is drastically decreased (in the step-like manner). In time period T3, because the second lower limit guard value gradually changes, the second lower limit guard value does not decrease in the step-like manner, and gradually increases.

Figure 14:
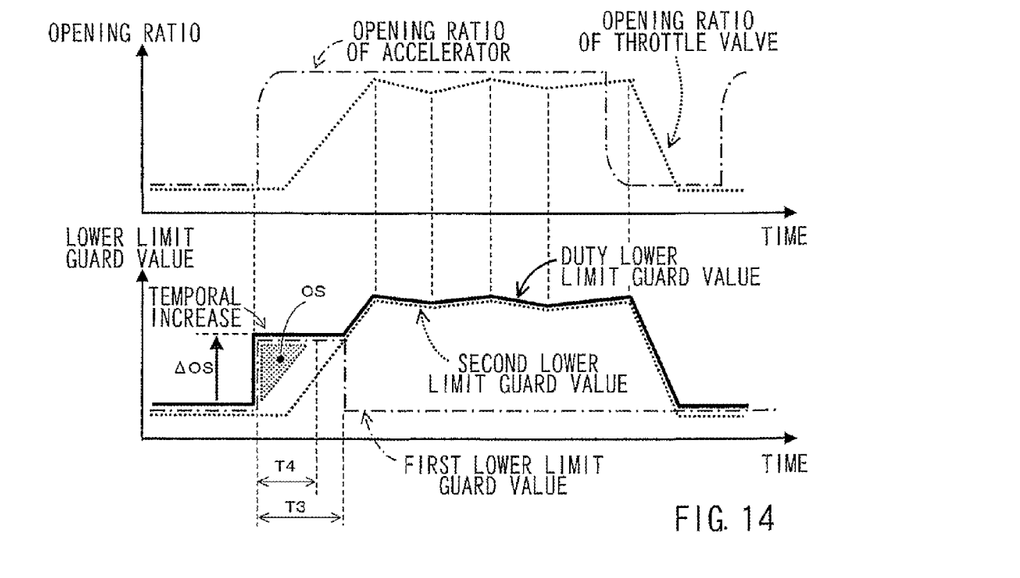
FIG. 14 is a graph illustrating a comparative example of an operation including overshoot.

In the operation of the comparative example shown in a lower portion of FIG. 14, the duty lower limit guard value (shown by the bold solid line) includes a drastic increase ΔOS, so that there is a possibility that the overshoot of the fuel pressure occurs. Whereas, in the operation of this embodiment shown in the lower portion of FIG. 13, in time period T3, the upper limit value of the duty lower limit guard value is guarded with the lower limit value upper limit guard value calculated based on the duty ratio as shown by step 160 and step 165 in FIG. 12. This can eliminate the drastic increase ΔOS shown in the lower portion of FIG. 14, can correct the duty corresponding to excess OS, and can appropriately prevent the overshoot of the fuel pressure.

As described above, in a case that the duty lower limit guard value increases in the step-like manner (drastically increases), the upper limit value of the duty lower limit guard value at time when the increase in the step-like manner occurs is guarded in order to decrease the amount of the increase of the duty lower limit guard value in the step-like manner (step S160, step S165).

In the flowchart according to the first embodiment shown in FIG. 2, the process of step S110 and steps S125-S145 prevents the undershoot. Whereas, in the flowchart according to the second embodiment shown in FIG. 12, both the undershoot and the overshoot are prevented by adding step S160 and step S165 to the flowchart according to the first embodiment of FIG. 2. Here, steps S110 and S125-S145 can be removed from the flowchart of FIG. 12 in order to prevent the overshoot only. Accordingly, at least one of the undershoot and the overshoot can be prevented by using any one of the flowcharts.

The invention claimed is:

1. A fuel supply system for an internal combustion engine, comprising:
   a fuel pump capable of pumping fuel from a fuel tank to the internal combustion engine;
   a motor driving the fuel pump;
   a pressure sensor configured to detect pressure of the fuel pumped from the fuel pump; and
   a control unit configured to output control signals to the motor, to perform feedback control of duty ratio of the control signals for the motor such that the pressure of the pumped fuel comes close to a predetermined target fuel pressure, to receive information relating to pressure of the fuel discharged from the fuel pump and information relating to an operating condition of the internal combustion engine, to calculate the duty ratio of the control signals such that discharge fuel pressure based on the information relating to the pressure of the fuel discharged from the fuel pump comes close to the predetermined target fuel pressure, to output control signals corresponding to the calculated duty ratio to the motor, to calculate duty lower limit guard value depending on the operating condition of the internal combustion engine based on the information relating to the operating condition of the internal combustion engine, to guard the lower limit value of the duty ratio with the duty lower limit guard value when outputting the control signals corresponding to the calculated duty ratio, and to control the duty lower limit guard value in order to limit an amount of decreases of the duty lower limit guard value in the step-like manner when the duty lower limit guard value decreases.

2. The fuel supply system according to claim 1, wherein the control unit is configured to calculate a first lower limit guard value that is temporarily increased while meeting predetermined requirements depending on the operating condition of the internal combustion engine based on the information relating to the operating condition of the internal combustion engine and a second lower limit guard value that is gradually changed by adding or subtracting integration value depending on the operating condition of the internal combustion engine based on the information relating to the operating condition of the internal combustion engine, to use larger one of the first lower limit guard value and the second lower limit guard value as the duty lower limit guard value when guarding the lower limit value of the duty ratio, and, when the duty lower limit guard value is changed from the first lower limit guard value to the second lower limit guard value after eliminating the temporal increase of the first lower limit guard value and when the first lower limit guard value immediately before the change is larger than the second lower limit guard value immediately after the change, to assigns the first lower limit guard value immediately before the change in the second lower limit guard value immediately after the change.

3. The fuel supply system according to claim 2,
wherein the internal combustion engine is an engine for a vehicle having an accelerator and a throttle valve, and the throttle valve is configured to control air intake amount for the engine depending on the operating condition of the engine, which includes an opening ratio of the accelerator,
wherein the control unit is configured to calculate the first lower limit guard value depending on the opening ratio or change in the opening ratio of the accelerator, to temporarily increase the first lower limit guard value depending on the opening ratio or the change in the opening ratio of the accelerator while meeting predetermined requirements when the accelerator is changed in its opening direction, and to add or subtract the integration value in order to gradually change the second lower limit guard value depending on an opening ratio or change in the opening ratio of the throttle valve.

4. A fuel supply system for an internal combustion engine, comprising:
a fuel pump capable of pumping fuel from a fuel tank to the internal combustion engine;
a motor driving the fuel pump;
a pressure sensor configured to detect pressure of the fuel pumped from the fuel pump; and
a control unit configured to output control signals to the motor, to perform feedback control of duty ratio of control signals for the motor such that the pressure of the pumped fuel comes close to a predetermined target fuel pressure, to receive information relating to pressure of the fuel discharged from the fuel pump and information relating to an operating condition of the internal combustion engine, to calculate the duty ratio of the control signals such that discharge fuel pressure based on the information relating to the pressure of the fuel discharged from the fuel pump comes close to the predetermined target fuel pressure, to output control signals corresponding to the calculated duty ratio to the motor, to calculate duty lower limit guard value depending on the operating condition of the internal combustion engine based on the information relating to the operating condition of the internal combustion engine, to guard the lower limit value of the duty ratio with the duty lower limit guard value when outputting the control signals corresponding to the calculated duty ratio, and to control the upper limit value of the duty lower limit guard value in order to limit an amount of increases of the duty lower limit guard value in the step-like manner when the duty lower limit guard value increases.

5. The fuel supply system according to claim 4, wherein the control unit is configured to calculate a first lower limit guard value that is temporarily increased while meeting predetermined requirements depending on the operating condition of the internal combustion engine based on the information relating to the operating condition of the internal combustion engine and a second lower limit guard value that is gradually changed by adding or subtracting integration value depending on the operating condition of the internal combustion engine based on the information relating to the operating condition of the internal combustion engine, to use larger one of the first lower limit guard value and the second lower limit guard value as the duty lower limit guard value when guarding the lower limit value of the duty ratio, to calculate lower limit value upper limit guard value based on the duty ratio, to guard the upper limit of the duty lower limit guard value with the lower limit value upper limit guard value, and to guard the lower limit guard value with the duty lower guard value obtained after guarding the upper limit of the duty lower limit guard value with the lower limit value upper limit guard value.

6. The fuel supply system according to claim 5,
wherein the internal combustion engine is an engine for a vehicle having an accelerator and a throttle valve, and the throttle valve is configured to control air intake amount for the engine depending on the operating condition of the engine, which includes an opening ratio of the accelerator,
wherein the control unit is configured to calculate the first lower limit guard value depending on the opening ratio or change in the opening ratio of the accelerator, to temporarily increase the first lower limit guard value depending on the opening ratio or the change in the opening ratio of the accelerator while meeting predetermined requirements when the accelerator is changed in its opening direction, and to add or subtract the integration value in order to gradually change the second lower limit guard value depending on an opening ratio or change in the opening ratio of the throttle valve.

* * * * *